Oct. 25, 1949.  J. E. ANDREAU  2,485,543
POWER PLANT
Filed Aug. 29, 1946  4 Sheets-Sheet 1
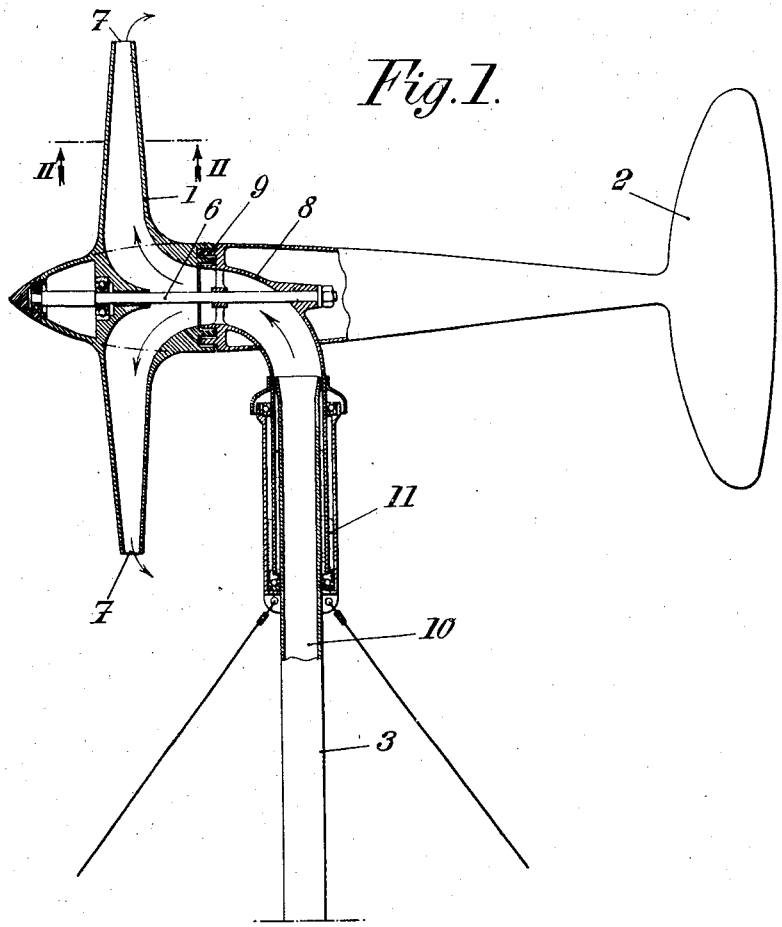
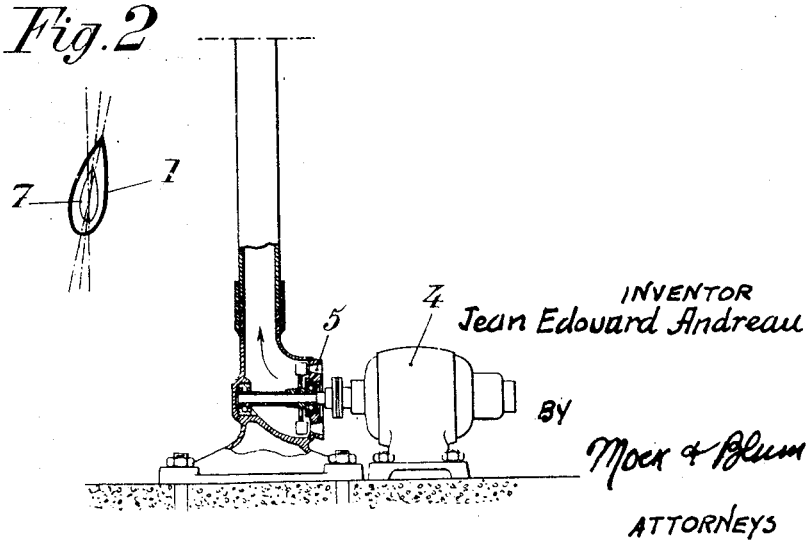
INVENTOR
Jean Edouard Andreau
BY
Moex & Blum
ATTORNEYS Oct. 25, 1949.     J. E. ANDREAU     2,485,543
POWER PLANT
Filed Aug. 29, 1946     4 Sheets-Sheet 2
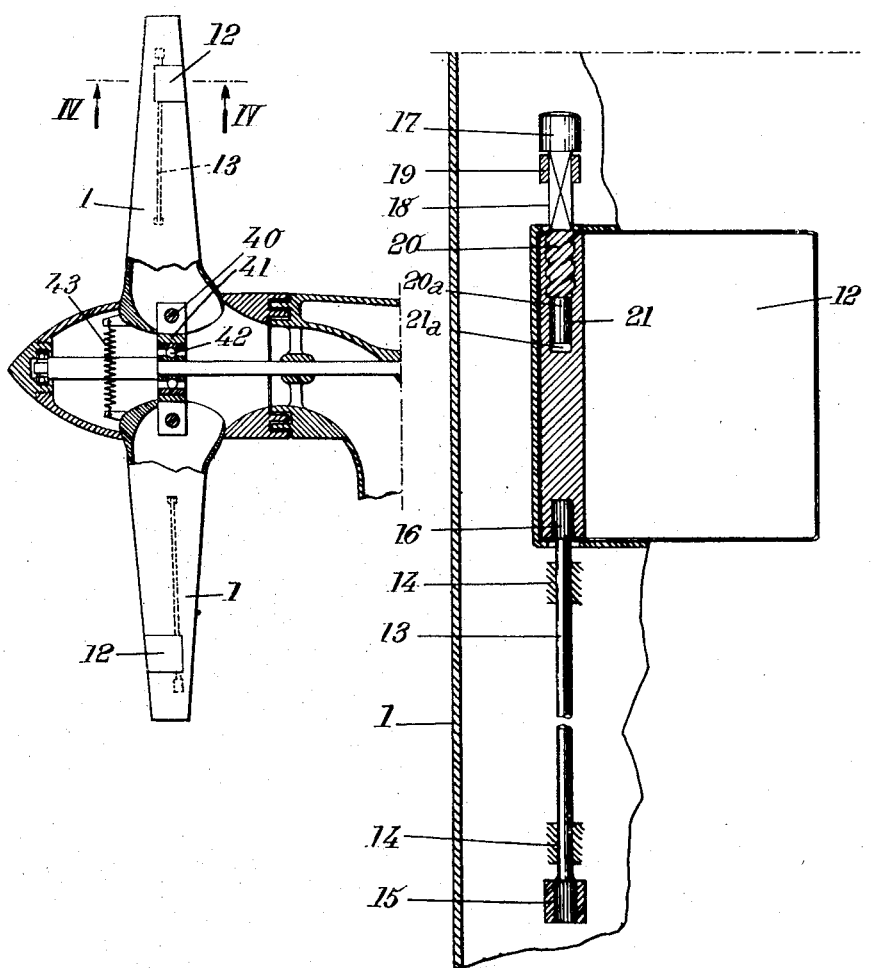
INVENTOR
Jean Edouard Andreau
BY
Mock & Blum
ATTORNEYS

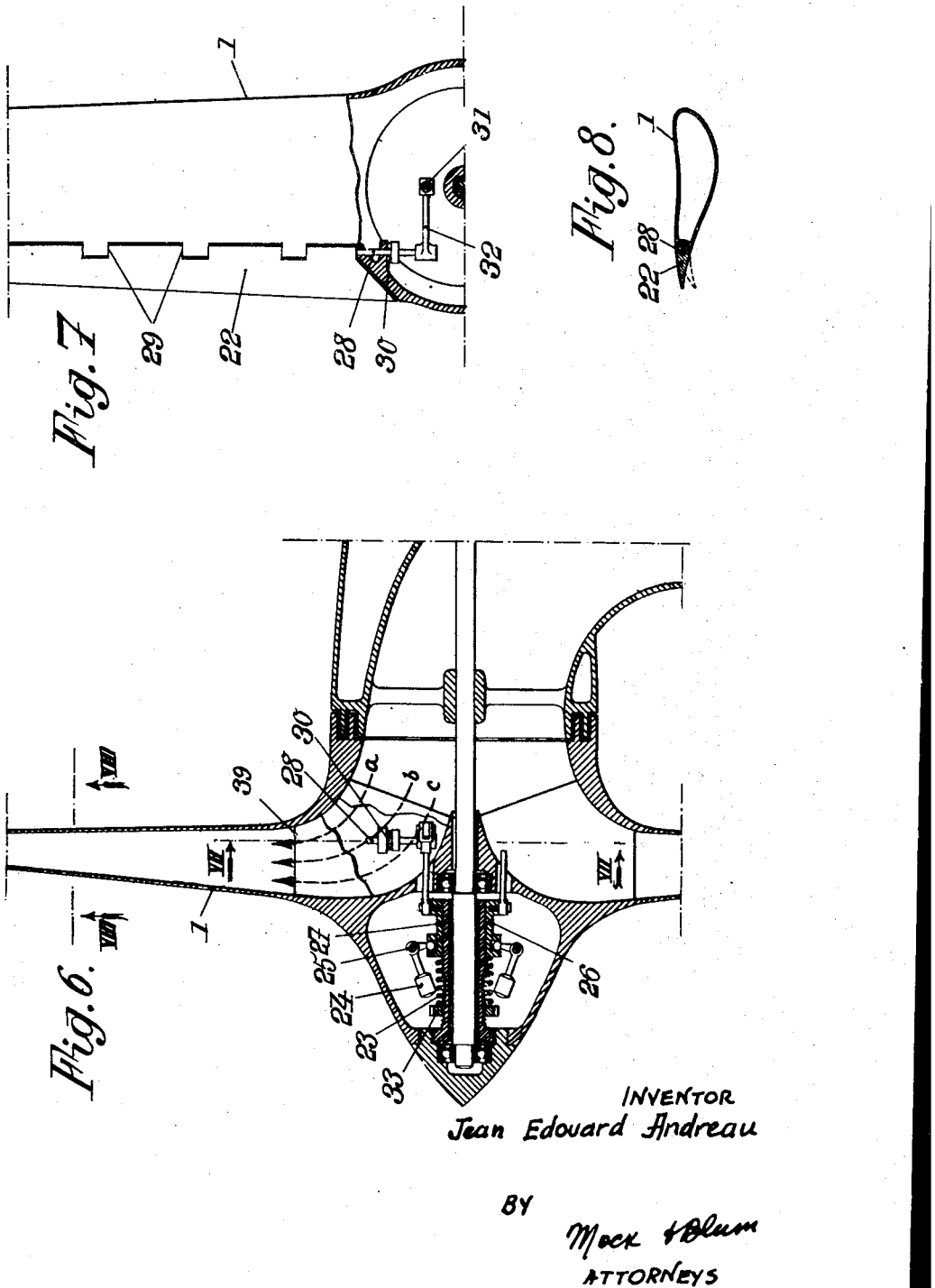

Oct. 25, 1949. J. E. ANDREAU 2,485,543
POWER PLANT
Filed Aug. 29, 1946 4 Sheets-Sheet 4

INVENTOR
Jean Edouard Andreau
BY
Mack Blum
ATTORNEYS

Patented Oct. 25, 1949

2,485,543

UNITED STATES PATENT OFFICE 2,485,543

POWER PLANT

Jean Edouard Andreau, Leognan, France

Application August 29, 1946, Serial No. 693,653
In France October 19, 1943

Section 1, Public Law 690, August 8, 1946
Patent expires October 19, 1963

17 Claims. (Cl. 60—60)

The present invention relates to power plants including a screw adapted to be rotated by the movement of a mass of fluid (for instance air) in which it is immersed, and it is more particularly, although not exclusively, concerned with wind engines.

The object of my invention is to provide a machine of this type which is better adapted to meet the requirements of practice than those used up to the present time; especially from the point of view of simplicity of construction and efficiency.

Other objects of my invention will result from the following detailed description of some specific embodiments thereof with reference to the accompanying drawings, given merely by way of example, and in which:

Fig. 1 is a vertical sectional view of a wind engine made according to my invention;

Fig. 2 is a sectional view on the line II—II of Fig. 1;

Fig. 3 is an axial sectional view of a wind engine according to my invention provided with automatic regulating means;

Fig. 4 is a section on a smaller scale on the line IV—IV of Fig. 3;

Fig. 5 is a part view on an enlarged scale illustrating the construction of the regulating means of Fig. 3;

Fig. 6 is an axial sectional view of another embodiment of a wind engine according to my invention;

Fig. 7 is a section on the line VII—VII of Fig. 6;

Fig. 8 is a section on the line VIII—VIII of Fig. 6;

Figure 10:
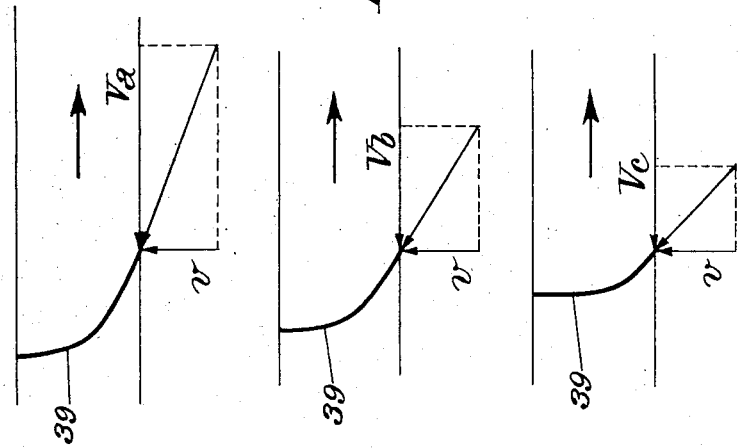
Fig. 10 shows diagrams relating to the shape of certain elements of the structure of Fig. 6.

The power plant according to the present invention essentially includes an airscrew 1 mounted on a horizontal axle 6 adapted to pivot freely at the top of post 3 about a vertical axis, and provided with a tail 2 for keeping said airscrew in a plane perpendicular to the direction of the wind.

According to my invention, instead of providing, between this airscrew and a suitable receiver such for instance as dynamo 4, a mechanical transmission, I make use of a pneumatic transmission, airscrew 1 driving a centrifugal fan which produces a motive air stream for driving an air turbine 5 coupled, preferably directly, with dynamo 4.

Advantageously, as shown by the drawings, propeller 1 and said centrifugal fan are combined into one single element, journalled on axle 6. For this purpose, the blades and the hub of the airscrew are made hollow and outlets 7 are provided at the ends of the blades for connecting the inside thereof with the atmosphere.

A fluidtight joint 9 is provided between a central aperture provided in the airscrew hub and the outlet of a bent tubular element 8 rigid with axle 6, the inlet of said element 8 being connected with a vertical air conduit 10 through another fluidtight joint 11, for instance a hydraulic joint.

Advantageously, the airscrew, which has no starting torque to supply, is of very low relative pitch, that is to say adapted to rotate at high speed, which ensures a high suction. The successive cross sections of the blades are theoretical sections, having relative thicknesses that go increasing toward the hub and camber to chord ratios that go increasing from the tips to points half way between the axis and said tips, and decreasing from said points to the hub. The relative width of the blade is substantially constant, same as the relative pitch, which is about 0.2.

I thus obtain the maximum of power with two blades of a relative width of about 20% of the outer diameter of the air-screw.

Of course the shape of the passages provided inside the blades is chosen in such manner as to lead air from the hub to the tips of the blades with as little eddies as possible. This shape is therefore analogous to that adopted for the construction of centrifugal pumps. As the airscrew blades have cross section areas that decrease from center toward periphery, they constitute convergent conduits through which the flow is regular.

Advantageously, the air conduit 10 is constituted by a stayed tube which constitutes post 3 itself. Its inner diameter should be about 10% of the diameter of airscrew 1 for posts of a height of 15–20 meters.

If it is desired to obtain an exactly constant speed of turbine 5, I may, for instance, make use of pressure relief means for operating the air intake. The regulation device may be analogous to that used for turbines in general and be adapted to work as a function of the number of revolutions per minute of the turbine and of the suction.

According to another feature of my invention, in order to regulate the speed of revolution of the airscrew, I make use of aerodynamic braking means operative in response to rises of the speed of revolution of the airscrew beyond a given value.

For instance, as shown by Figs. 3 to 5, the braking means in question are constituted by spoilers 12 hinged to blades 1 and subjected to the action of centrifugal means adapted to bring said spoilers into action as a function of the speed of revolution of the airscrew.

In the example shown, each spoiler 12 is pivoted with respect to the corresponding blade 1 by being mounted on a rod 13 extending in the general direction of the leading edge of said blade. Spring means are provided for urging the spoiler toward the position in which it is applied against the side of the airscrew blade. Advantageously, as shown, each of said spring means is constituted by rod 13 itself, which acts as a torsion bar, journalled in the blade at 14 and fixed therein about its axis at its end, at 15, for instance by means of longitudinal grooves. Spoiler 12 is angularly fixed to torsion bar 13 at 16.

The centrifugal means that control the position of spoiler 12 are constituted by a mass 17 carried by a rod 18 of square section guided in a part 19 of the airscrew blade.

The sliding displacements of mass 17 are transformed into pivoting displacements of spoiler 12 by means of a screw 20 rigid with bar 18 and engaged in a screw threaded hole of the hub 21 of the flap, a cylindrical extension 20a of said screw being freely movable in a corresponding recess 21a of hub 21.

The aerodynamic action of spoilers 12 is particularly interesting because, in addition to the braking effect, they exert when pivoted by centrifugal masses 17 when the speed of revolution of the airscrew increases beyond given limits, which effect is due to an increase of the drag coefficient of the airfoils constituted by the blades, they simultaneously produce a reduction of the lift coefficient thereof, so that when said spoilers are in action, the axial thrust on the airscrew increases at a lower rate than the wind velocity.

In order further to reduce the stress on blades 1, the latter are pivoted about axes 40 carried by an annular ring 41 rotatably mounted, for instance with the interposition of a ball bearing 42, on the axle 6 of the airscrew. A spring 43 urges blades 1 toward their desired positions at right angles to axle 6.

According to another embodiment of my invention, illustrated by Figs. 6 to 9, aerodynamic speed regulation is obtained by means of flaps 22 mounted on the trailing edges of the blades, similarly to those used in connection with airplane wings, and operated, against the action of a spring 23, by a part subjected to the action of the centrifugal force so that, above a given speed of revolution, they are pivoted out of neutral position to an angle variable in direct ratio to the actual speed of revolution.

According to the embodiment illustrated by Figs. 6 to 8, the above mentioned part subjected to the action of the centrifugal force is constituted by a system of masses 24 pivotally mounted on the axle 6 of the airscrew about eccentric axes 25, these masses being adapted to act, through connections of a conventional type, and against the action of spring 23, on a sleeve 26 slidable on a tube 27 fixed to axle 6.

Each flap 22 is hinged to the corresponding blade of the airscrew through a rod 28 mounted on hinges 29. Said rod, which is rigid with its flap 22, bears, through a thrust bearing 30, against a part rigid with the corresponding blade, being applied against said part by the centrifugal force.

Sleeve 26 is connected through links 31 with arms 32 carried by the inner ends of rods 8.

In order to permit adjustment of the compression of springs 23, a nut 33 is screwed on tube 27.

Preferably, this device is arranged in such manner that when the speed of the airscrew is lower than a given maximum value flaps 22 remain in neutral position, that is to say substantially in line with the respective airscrew blades, whereas, when the speed exceeds this maximum value, said flaps are pivoted from said position through angles greater and greater as said speed increases.

Now, in the pivoted positions, the flaps reduce the lift and increase the drag of the airscrew blades, thus producing a gradual decrease of the blade tangential velocity to wind velocity ratio, whereby this ratio can be limited to a predetermined maximum.

Figure 9:
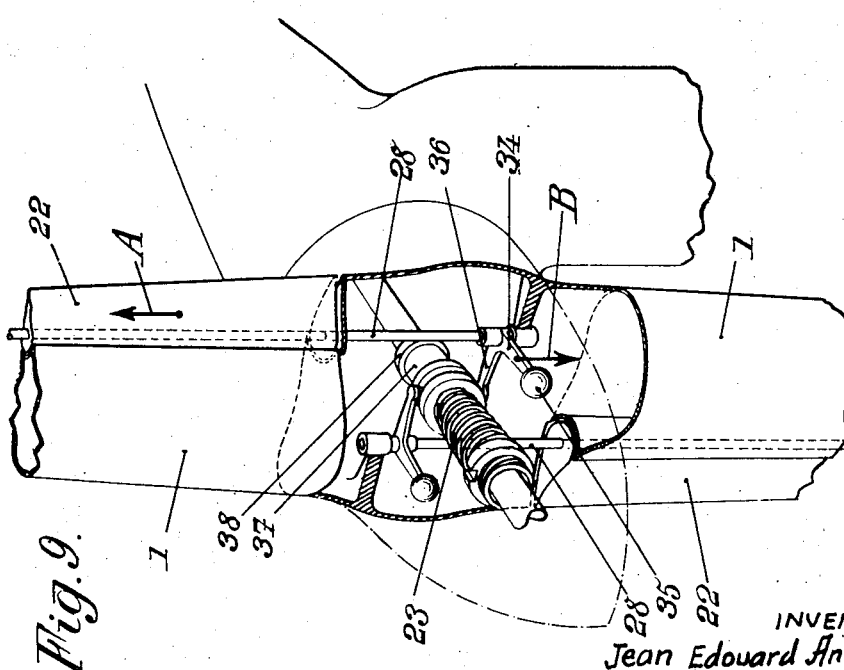
Fig. 9 is a perspective view, with parts removed, of another embodiment.

According to a modification of this device, illustrated by Fig. 9, each of the above mentioned rods 28 extends beyond the plane perpendicular thereto that passes through the axis of the airscrew and carries, at its inner end, an arm 34 provided with a mass 35 adapted, under the action of the centrifugal force, to rotate rod 28 about its axis in the direction that corresponds to a braking of the rotation of the airscrew blade.

Rod 28 further carries a finger 36, rigid with arm 34 and engaged in a groove of a sleeve 37 pushed back by spring 23 toward an abutment 38. When sleeve 37 is in contact with this abutment, flaps 22 are in neutral position.

It will be readily understood that, with such an arrangement, the centrifugal forces that act upon a flap 22 and the corresponding mass 35, arm 34 and finger 36 have opposed components A and B which at least partly balance each other about the axis of rod 28. Thus the thrust bearing carried by the blade is relieved and sensitiveness is improved.

This device works in a manner quite similar to that shown by Figs. 6 to 8.

It is pointed out that, as the trailing edge portions of the airscrew blades are very sharp, the fact that these portions are constituted by hinged flaps does not appreciably reduce the cross section available inside the blade for the flow of air.

According to still another feature of my invention, I provide, inside the airscrew, in the hub portion thereof, guiding blades 39 (Fig. 6) for gradually imparting rotation movement to the stream of air that axially enters the hub.

These blades are curved in such manner that, on the leading edge of each of them, the tangent of the angle of incidence is equal to the ratio of the peripheral velocity $Va$, $Vb$, $Vc$ (Fig. 10) to the axial velocity $v$ of the entering air stream.

On the contrary, on the trailing edge, each blade extends in the radial direction.

Fig. 10 shows the shapes of the blades' profiles in question along paths of travel $a$, $b$, $c$, shown on Fig. 6.

A machine analogous to those above described might be used in a water stream, for instance in a river or in a channel subjected to the action of tides. In this case, the screw is immersed in water and the conduit that connects it with the turbine is filled with water, the turbine intake being of course also immersed in water.

In this case, a stream velocity of 1 meter per second corresponds to a drop of about 5.5 meters.

In a general manner, while I have, in the above description, disclosed what I deem to be practial and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A power plant which comprises, in combination, a freely rotatable screw mounted to be driven through its external surface by a stream of fluid in which it is immersed and centrifugal means inside said screw for producing a stream of active fluid.

2. A power plant which comprises, in combination, a freely rotatable screw mounted to be driven through its external surface by a stream of fluid in which it is immersed, centrifugal means inside said screw for producing a stream of motive fluid, adjustable means carried by said screw for braking the rotation thereof by reaction on said fluid stream, and centrifugal means for regulating said braking means as a function of the speed of revolution of said screw.

3. A wind power plant which comprises in combination, a windmill airscrew, an axle for said airscrew, a support for said axle, a conduit extending downwardly from the level of said axle, said airscrew being hollow and open at the ends of its blades to form a centrifugal fan, fluidtight joint means for connecting the top end of said conduit with the central portion of the inside of said airscrew, whereby a stream of motive air is sucked in by said fan through said conduit, flaps hinged to the trailing edge portions of the airscrew blades, and centrifugal means carried by said airscrew for operating said flaps to bring them into aerodynamic braking positions corresponding to the speed of revolution of the airscrew when said speed of revolution exceeds a given value.

4. A wind power plant according to claim 3 in which said centrifugal means include a sleeve slidable in said airscrew along the rotation axis thereof, at least one mass pivoted in said airscrew about an axis transverse to said rotation axis and at a distance from the center of gravity of said mass, interconnecting means between said mass and said sleeve for transforming rotational displacements of said mass about said last mentioned axis into axial displacements of said sleeve, elastic means for yieldingly opposing said axial displacements, and interconnecting means between said sleeve and said flaps for transforming axial displacements of said sleeve into pivoting displacements of said flaps about their respective hinges.

5. A wind power plant according to claim 3 in which said centrifugal means include a rod rigid with each of said flaps and journalled in the corresponding airscrew blade about an axis at right angles to the rotation axis of said airscrew, each of said rods having a portion extending to a distance beyond the plane passing through said rotation axis that is at right angles to said rod, a lever carried by each of said rod portions transversely thereto and located, in the state of rest, in a plane making with the airscrew rotation axis an angle different from 90°, a centrifugal mass carried by said lever at a distance from said rod, means for synchronizing the rotational displacements of said rods about their respective axes, and elastic means for yieldingly opposing said rotational displacements as produced by said centrifugal masses.

6. A wind power plant according to claim 3 in which said centrifugal means include a rod rigid with each of said flaps and journalled in the corresponding airscrew blade about an axis at right angles to the rotation axis of said airscrew, each of said rods having a portion extending to a distance beyond the plane passing through said rotation axis that is at right angles to said rod, two levers carried by each of said rod portions transversely thereto, one of said levers being located, in the state of rest, in a plane making with the airscrew rotation axis an angle different from 90°, a centrifugal mass carried by said last mentioned lever at a distance from said rod, means for interconnecting the two other levers of said rods for synchronizing the rotational displacements of said rods about their respective axes, and elastic means for yieldingly opposing said rotational displacements as produced by said centrifugal masses.

7. A wind power plant which comprises, in combination, a windmill airscrew, an axle for said airscrew, a support for said axle including a downwardly extending conduit having its top end coaxial with said airscrew, said airscrew being hollow and open at the ends of its blades to form a centrifugal fan, fluid-tight joint means for connecting said top end of said conduit with the central part of the inside of said airscrew, whereby a stream of motive air is sucked in by said fan through said conduit, and guiding means in the central portion of said propeller for gradually bringing into radial direction the axial stream of air from said conduit.

8. A power plant which comprises, in combination, a freely rotatable hollow structure immersed in a fluid in movement and the outer surface of which is shaped to constitute a fluid mill, whereby it is driven by the stream of external fluid around it, means forming a circuit fluid in communication with the inside of said structure, and centrifugal means inside said structure for inducing a flow of fluid through said circuit under the effect of rotation of said structure caused by the stream of external fluid.

9. A power plant which comprises, in combination, a hollow windmill element, means forming a fluid circuit in communication with the inside of said windmill element, and centrifugal means inside said element for inducing a flow of fluid through said circuit under the effect of rotation of said windmill.

10. A wind power plant which comprises, in combination, a windmill airscrew, an axle for said airscrew, a support for said axle, a conduit extending downwardly from the level of said axle, said airscrew being hollow and open at the ends of its blades to form a centrifugal fan and fluidtight means for connecting the top end of said conduit with the central part of the inside of said airscrew whereby a stream of motive air is scked in through said conduit.

11. A wind power plant which comprises, in combination, a windmill airscrew, a horizontal axle for said airscrew, a post forming both a vertical conduit and a support for said axle, said airscrew being hollow and open at the ends of its blades to form a centrifugal fan and fluidtight means for connecting the top end of said conduit with the central part of the inside of said airscrew whereby a stream of motive air is sucked in through said conduit.

12. A wind power plant which comprises, in combination, a windmill airscrew, an axle for said airscrew, a support for said axle, a hollow casing carried by said support at the level of said axle, a conduit extending downwardly from the level of said axle, said airscrew being hollow and opened at the ends of its blades to form a centrifugal fan and fluidtight means for connecting opposite ends of said casing with the to pend of said conduit and the central part of the inside of said airscrew, respectively, whereby a stream of motive air is sucked in through said conduit.

13. A wind power plant which comprises, in combination, a windmill airscrew, an axle for said airscrew, a support for said axle, a conduit extending downwardly from the level of said axle, said airscrew being hollow and opened at the ends of its blades to form a centrifugal fan and fluidtight means for connecting the top end of said conduit with the central part of the inside of said airscrew, whereby a stream of motive air is sucked in through said conduit, a rod extending in the longitudinal direction of each airscrew blade and slidable therein in said direction, a spoiler pivoted to the back side of each blade adapted to fit against said back side, elastic means for urging said spoiler against its position of application along said blade back side, and centrifugal means for moving said spoiler against said elastic means in response to increasing speeds of revolution of the airscrew.

14. A wind power plant according to claim 13, in which said centrifugal means include a mass slidable radially in said blade, means for guiding said mass to prevent rotation thereof with respect to said blade and cooperating screw means carried by said mass and said spoiler.

15. A wind power plant which comprises, in combination, a windmill airscrew, an axle for said airscrew, a support for said axle, a conduit extending downwardly from the level of said axle, said airscrew being hollow and opened at the ends of its blades to form a centrigufal fan and fluidtight means for connecting the top end of said conduit with the central part of the inside of said airscrew, whereby a stream of motive air is sucked in through said conduit, means movably carried by the blades of said airscrew for aerodynamically braking the rotation of said airscrew adapted to enter into action for a given position of said blades, and centrifugal means mounted on said airscrew for operating said braking means in accordance with the speed of revolution of said airscrew.

16. A wind power plant which comprises, in combination, a windmill airscrew, an axle for said airscrew, a support for said axle, a conduit extending downwardly from the level of said axle, said airscrew being hollow and opened at the ends of its blades to form a centrifugal fan and fluidtight means for connecting the top of said conduit with the central part of the inside of said airscrew, whereby a stream of motive air is sucked in through said conduit, the blades of said airscrew being pivotable with respect to its hub about respective axes perpendicular both to the axis of said axle and to the radial directions of said blades and spring means for resiliently opposing rearward pivoting of said blades about their respective pivot axes.

17. A wind power plant which comprises, in combination, a windmill airscrew, an axle for said airscrew, a support for said axle, a conduit extending downwardly from the level of said axle to a level below the lower portion of the circle described by the ends of the airscrew blades, said airscrew being hollow and opened at the ends of its blades to form a centrifugal fan and fluidtight means for connecting the top end of said conduit with the central part of the inside of said airscrew, whereby a stream of motive air is sucked in through said conduit, and a turbomachine having the output end of its turbo-portion connected to the bottom end of said conduit.

JEAN EDOUARD ANDREAU.

REFERENCES CITED

The following references are of record in the file of this patent:

UNITED STATES PATENTS

| Number | Name | Date |
|---|---|---|
| 1,013,798 | Messina | Jan. 2, 1912 |
| 1,399,157 | Rystedt | Dec. 6, 1921 |
| 1,603,966 | Lorenzen | Oct. 19, 1926 |
| 1,640,784 | Lorenzen | Aug. 30, 1927 |
| 2,076,520 | Swanson | Apr. 6, 1937 |
| 2,078,634 | Karlström | Apr. 27, 1937 |
| 2,148,921 | Allen | Feb. 28, 1939 |
| 2,305,810 | Müller | Dec. 22, 1942 |

FOREIGN PATENTS

| Number | Country | Date |
|---|---|---|
| 395,929 | Great Britain | July 27, 1933 |
| 647,287 | Germany | July 1, 1937 |
| 108,899 | Australia | Oct. 24, 1939 |